US011212737B2

(12) United States Patent
Agiwal et al.

(10) Patent No.: US 11,212,737 B2
(45) Date of Patent: Dec. 28, 2021

(54) METHOD FOR MANAGING SYSTEM INFORMATION WINDOW FOR TRANSMITTING AND RECEIVING SYSTEM INFORMATION

(71) Applicant: Samsung Electronics Co., Ltd., Suwon-si (KR)

(72) Inventors: Anil Agiwal, Suwon-si (KR); Gert-Jan Van Lieshout, Apeldoorn (NL); Himke Van Der Velde, Zwolle (NL); Mangesh Abhimanyu Ingale, Yongin-si (KR); Youngbin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 291 days.

(21) Appl. No.: 16/468,177

(22) PCT Filed: Dec. 15, 2017

(86) PCT No.: PCT/KR2017/014837
§ 371 (c)(1),
(2) Date: Jun. 10, 2019

(87) PCT Pub. No.: WO2018/111034
PCT Pub. Date: Jun. 21, 2018

(65) Prior Publication Data
US 2020/0084704 A1 Mar. 12, 2020

(30) Foreign Application Priority Data
Dec. 16, 2016 (IN) .............................. 201631042949

(51) Int. Cl.
*H04W 48/12* (2009.01)
*H04L 5/00* (2006.01)
*H04W 72/04* (2009.01)

(52) U.S. Cl.
CPC ........... *H04W 48/12* (2013.01); *H04L 5/0048* (2013.01); *H04L 5/0053* (2013.01); *H04W 72/042* (2013.01); *H04W 72/0446* (2013.01)

(58) Field of Classification Search
None
See application file for complete search history.

(56) References Cited

U.S. PATENT DOCUMENTS

2009/0319903 A1* 12/2009 Alanara ............ H04W 72/1289
715/733
2014/0293860 A1 10/2014 Hegde
(Continued)

FOREIGN PATENT DOCUMENTS

WO 2015/143244 A1 9/2015

OTHER PUBLICATIONS

3GPP TS 36.331 V13.3.0, '3GPP; TSGRAN; E-UTRA; RRC; Protocol specification (Release 13)', Oct. 3, 2016.

*Primary Examiner* — Kenny S Lin
*Assistant Examiner* — Richard Schnell
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method for managing system information (SI) window in a wireless communication system is provided. The method includes determining a plurality of SI messages to be transmitted at a time point, identifying a SI window number at the time point, and determining at least one of SI (Continued)

message among the plurality of SI messages, the at least one of SI message being included in a SI window corresponding to the SI window number.

11 Claims, 14 Drawing Sheets

(56) References Cited

U.S. PATENT DOCUMENTS

| | | |
|---|---|---|
| 2014/0293908 A1 | 10/2014 | Kumar et al. |
| 2015/0373531 A1 | 12/2015 | Goel et al. |
| 2016/0353473 A1 | 12/2016 | Chen et al. |
| 2017/0105166 A1 | 4/2017 | Lee et al. |
| 2017/0230977 A1* | 8/2017 | Shen .................. H04W 72/042 |

* cited by examiner

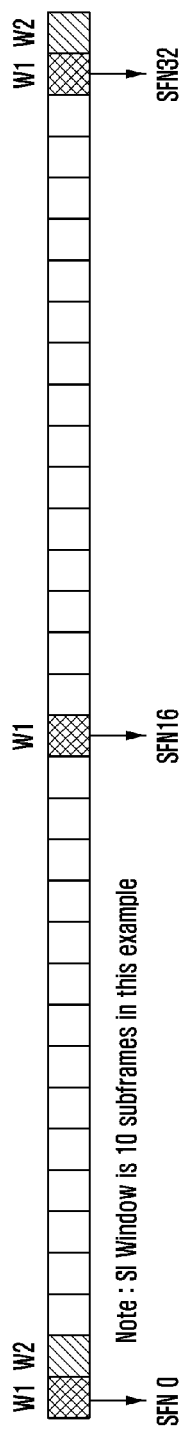
[Fig. 1]

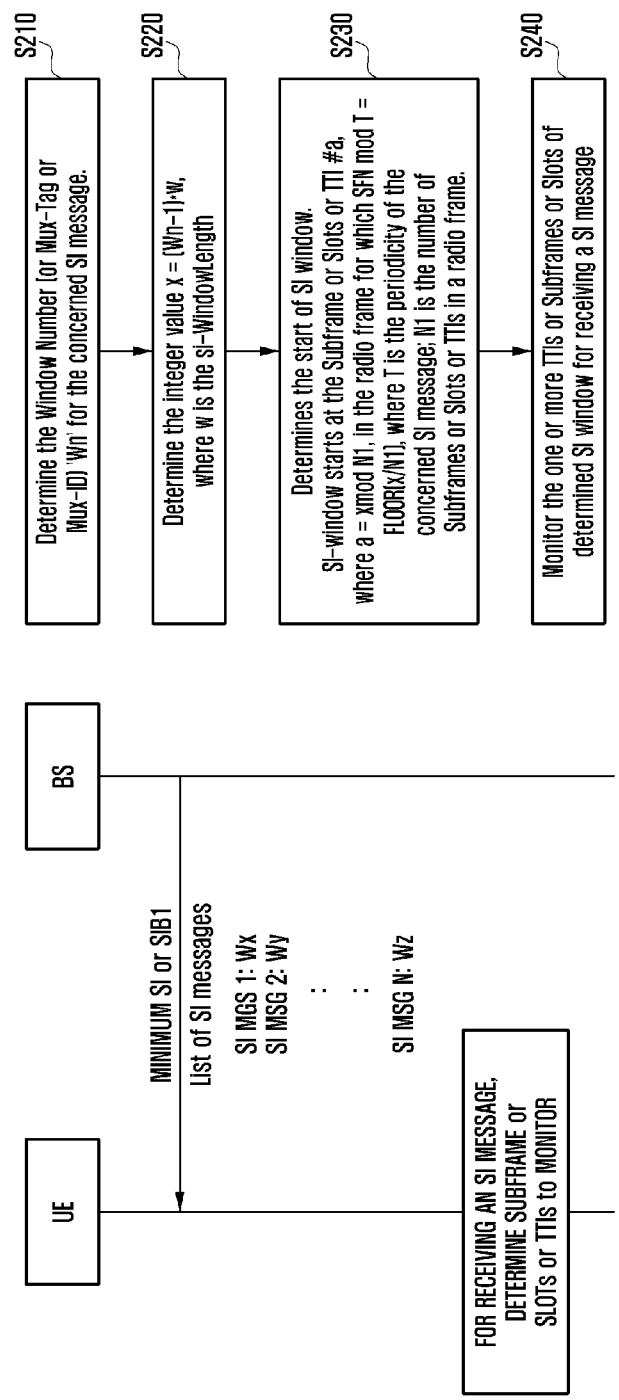

[Fig. 3]
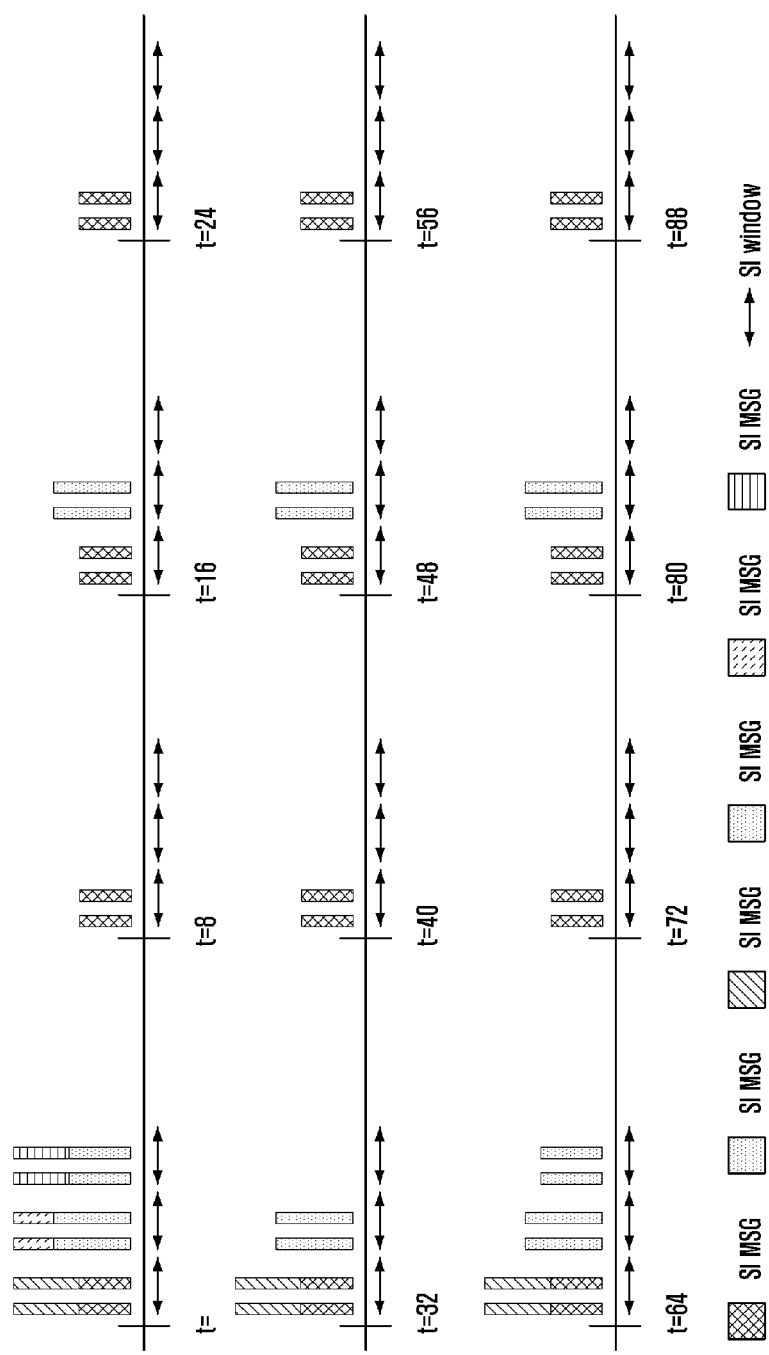

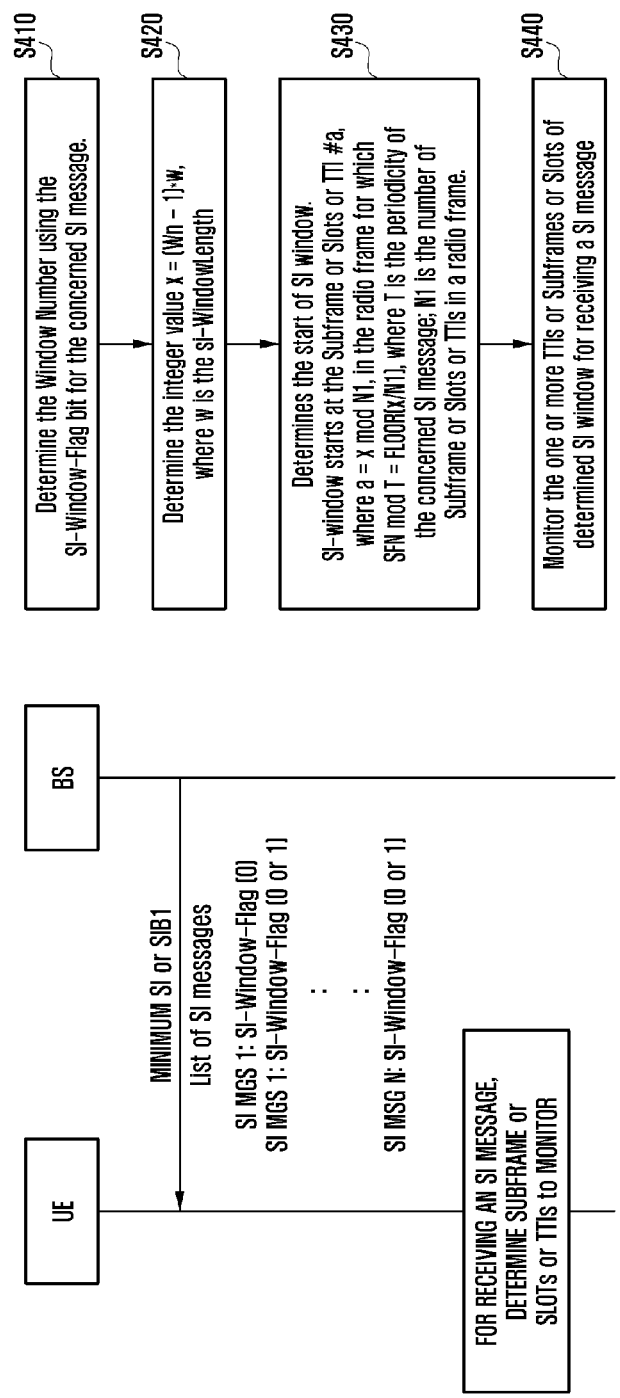
[Fig. 4]

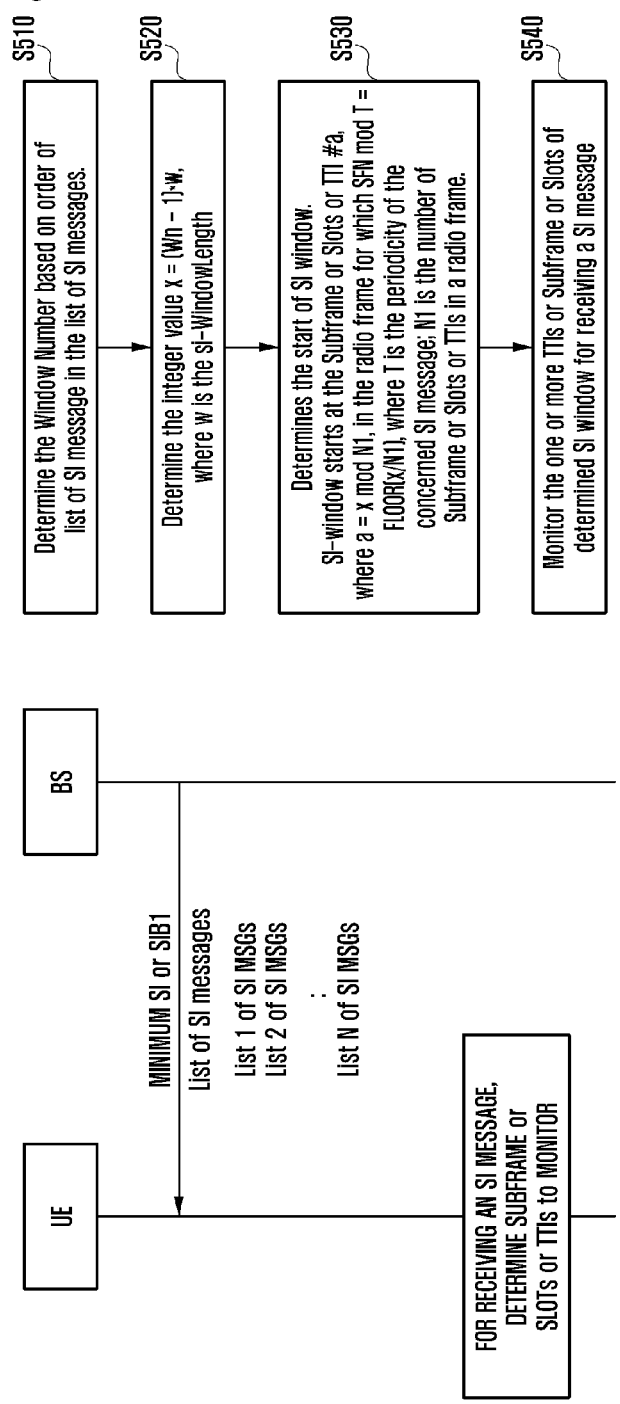
[Fig. 5]

[Fig. 6]
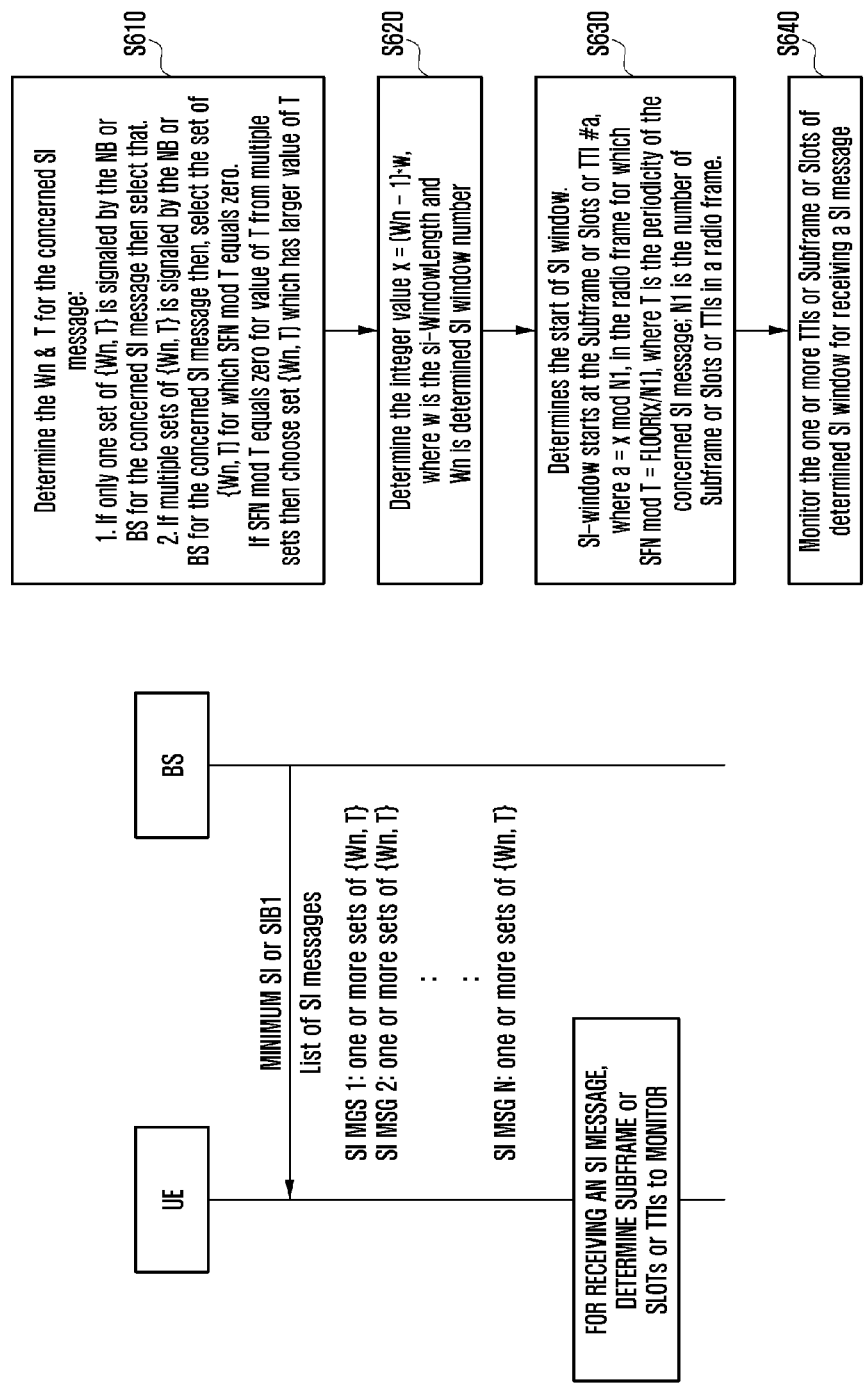

[Fig. 7]
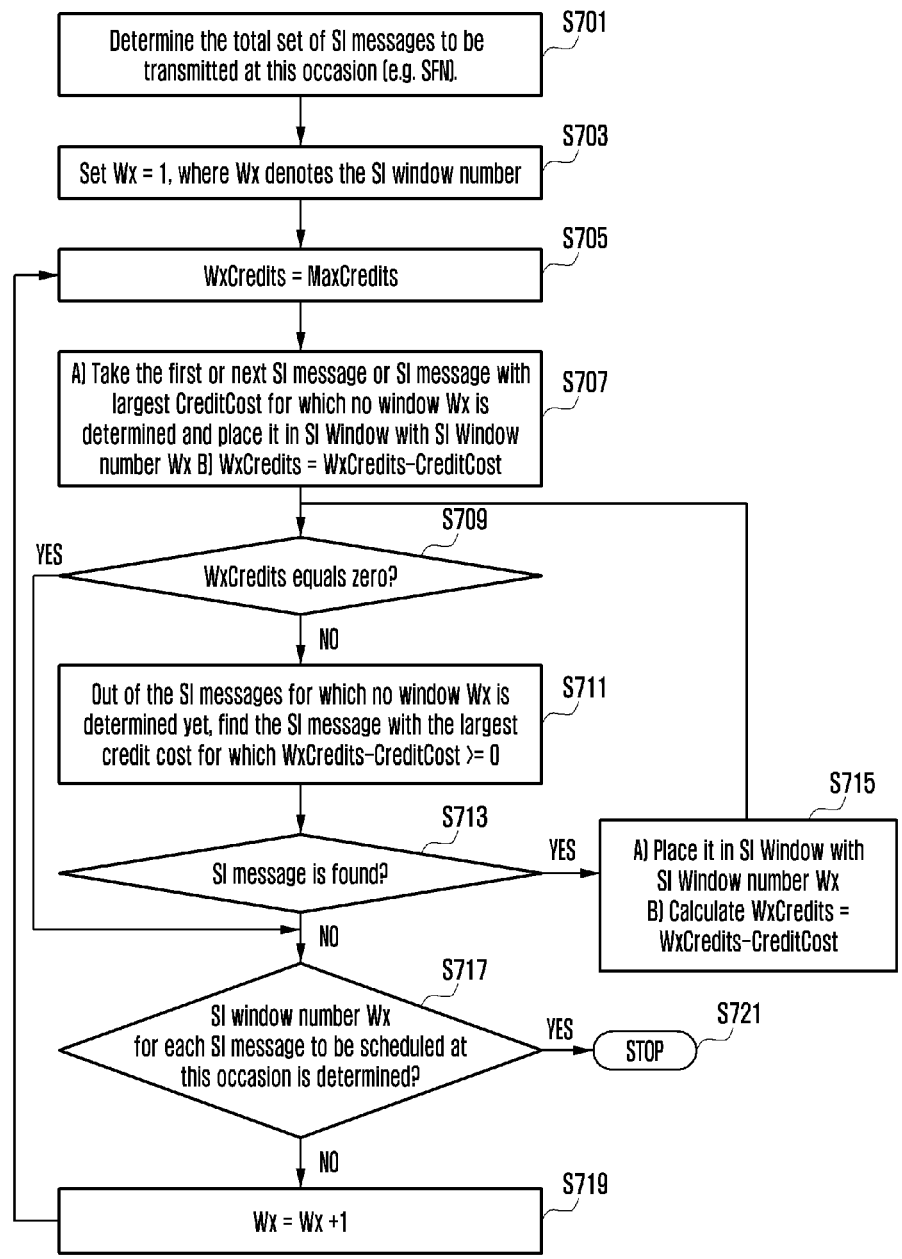

[Fig. 8]
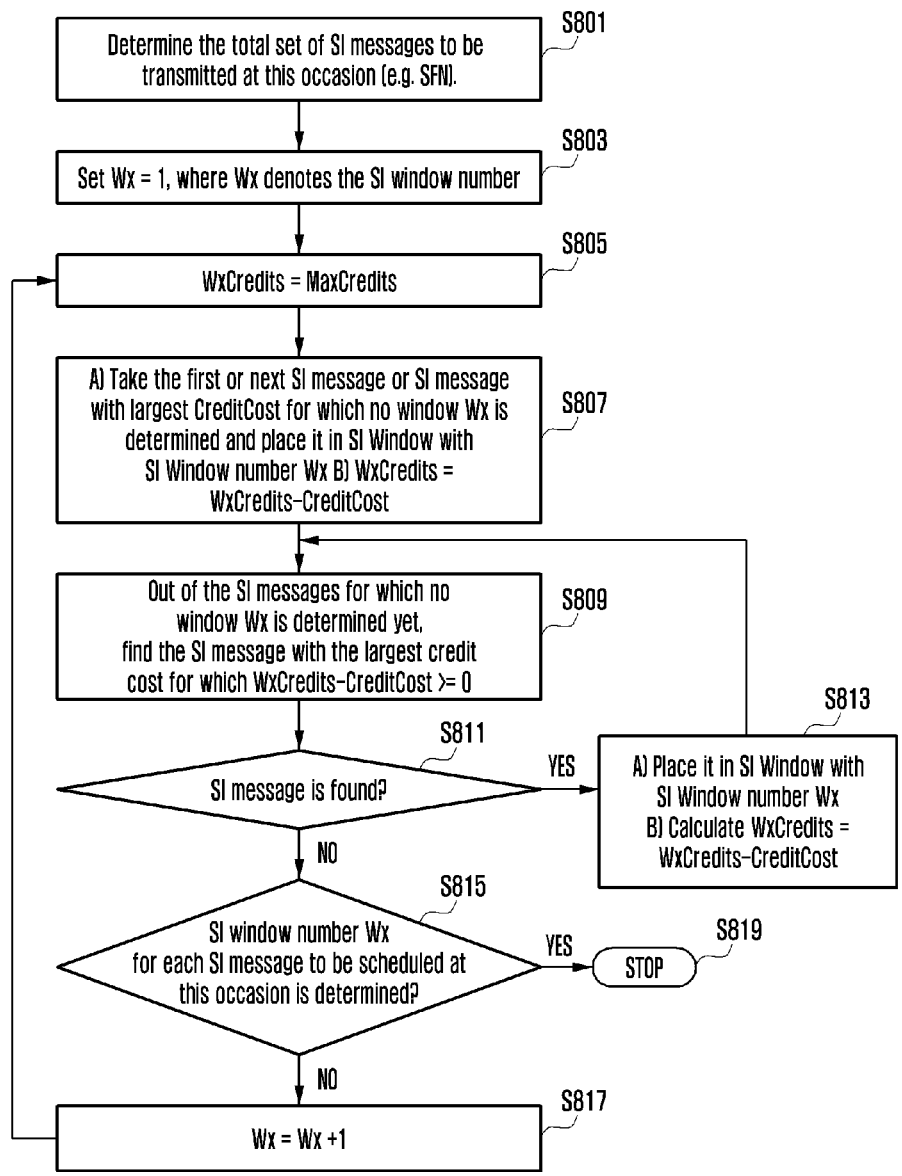

[Fig. 9]
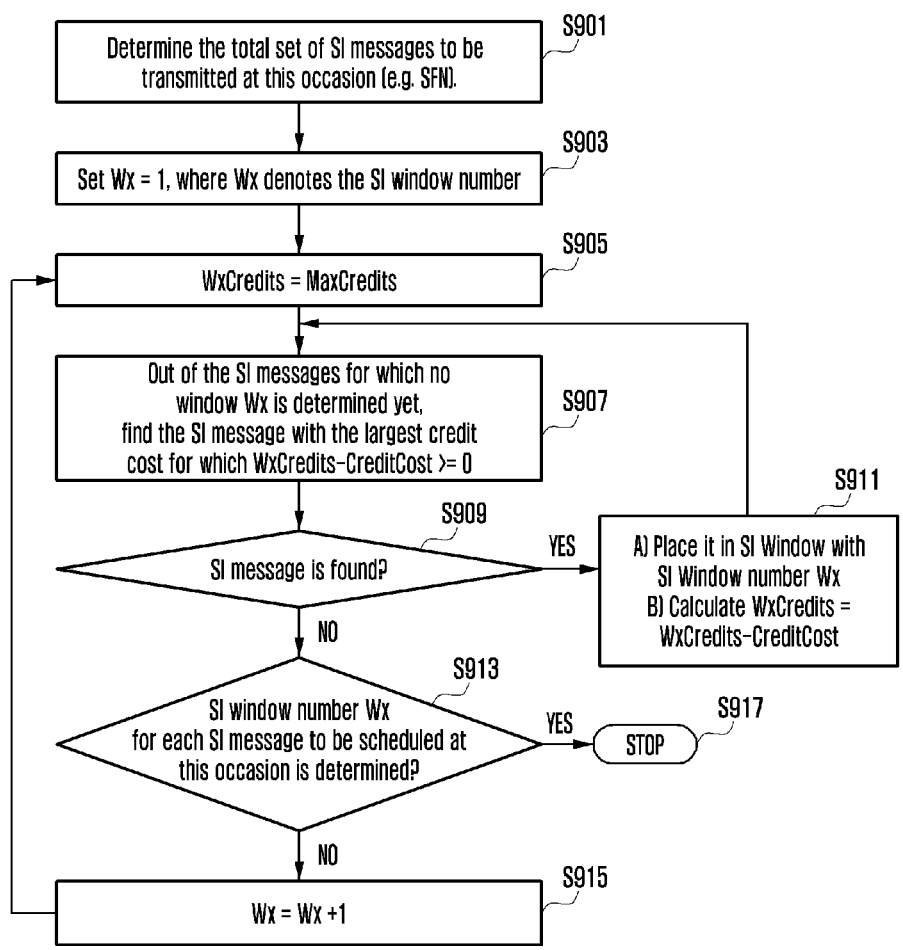

[Fig. 10]
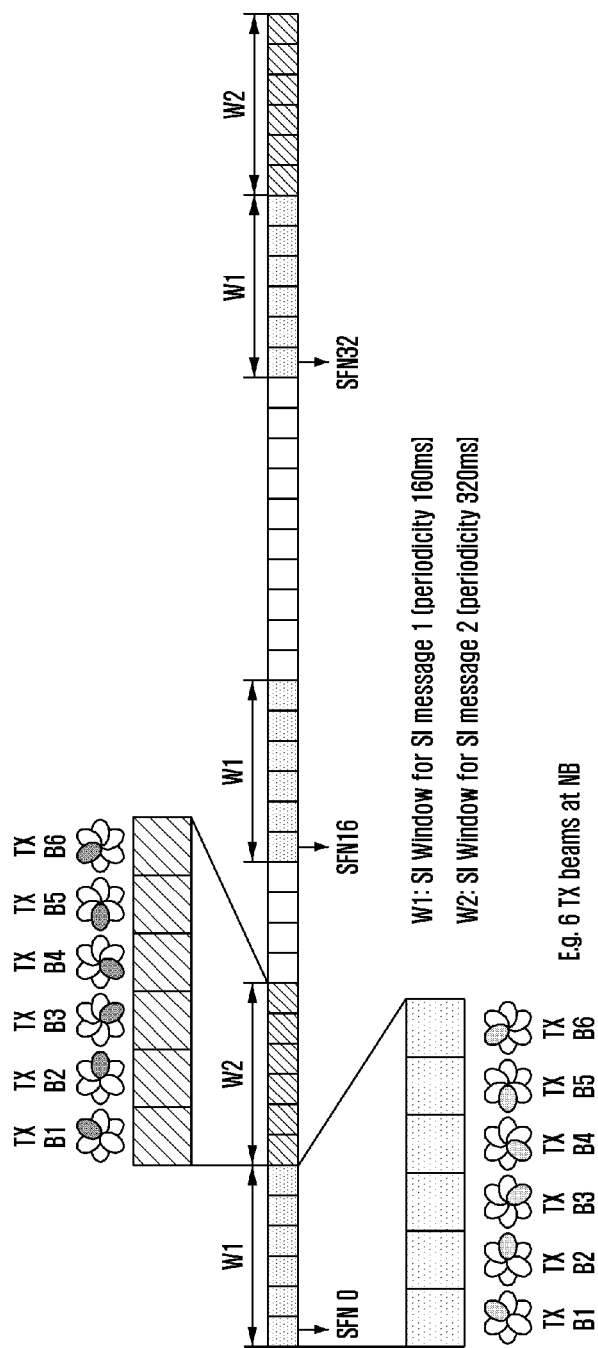

[Fig. 11]
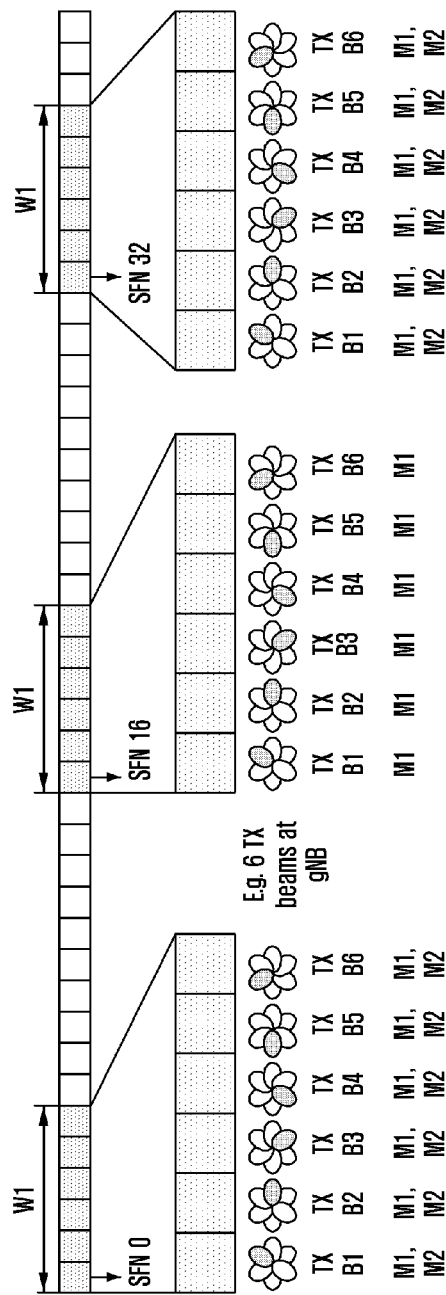

[Fig. 12]
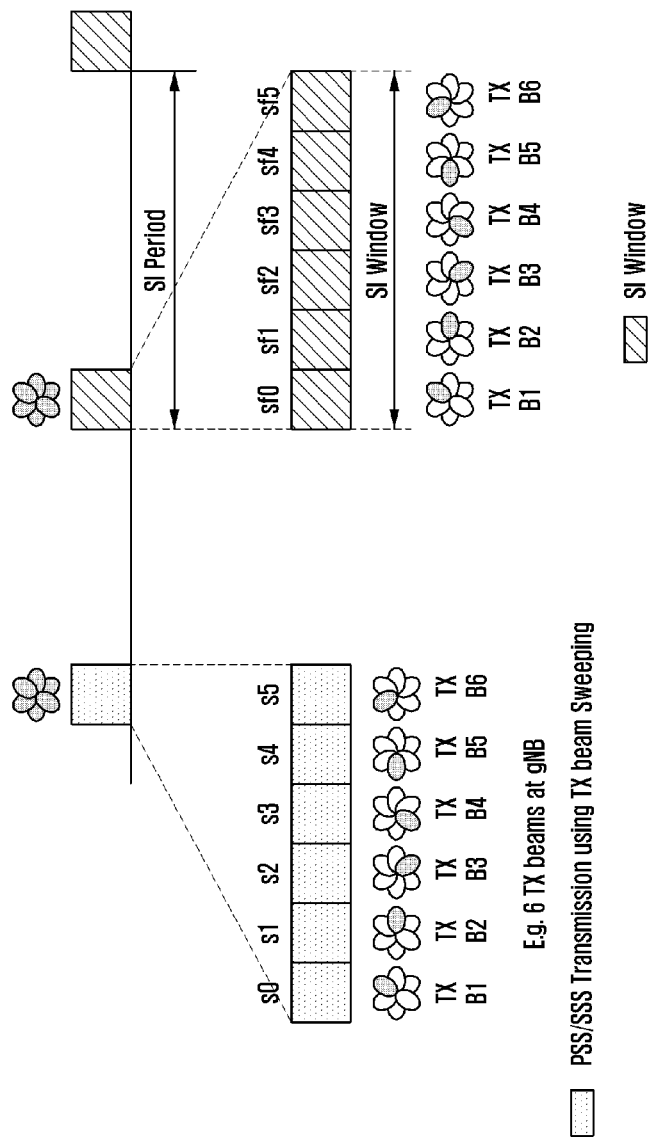

[Fig. 13]
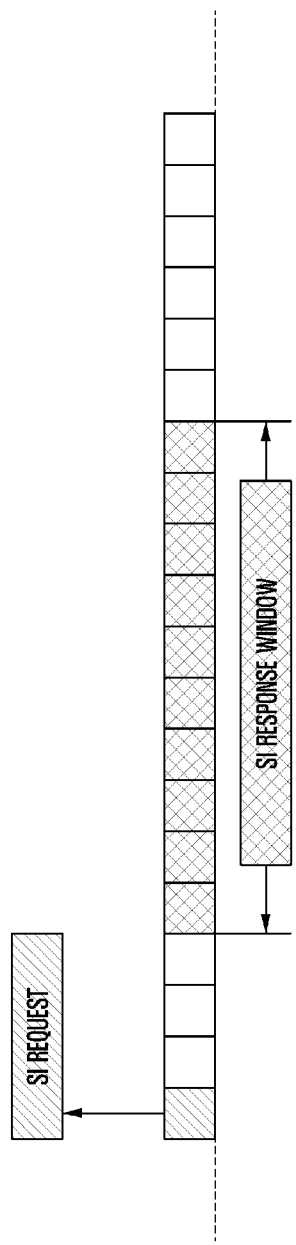

[Fig. 14]
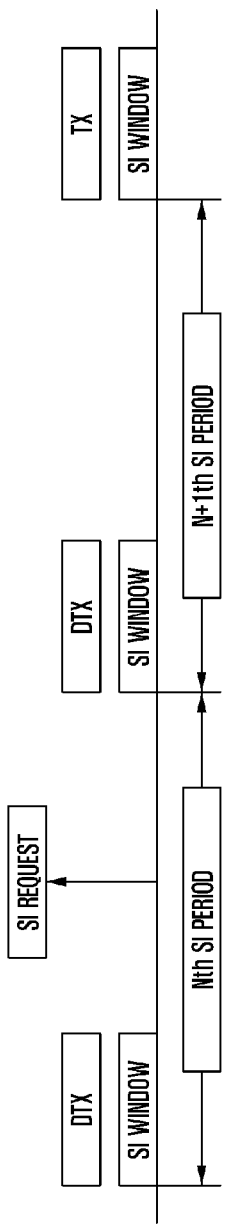
[Fig. 15]
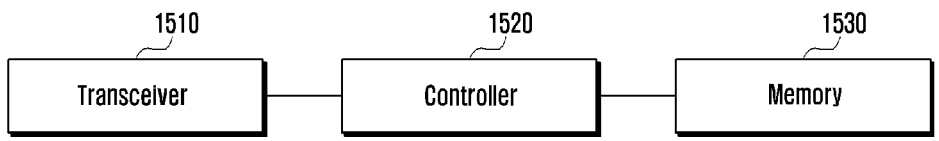
[Fig. 16]
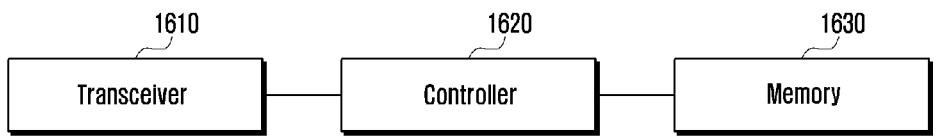

METHOD FOR MANAGING SYSTEM INFORMATION WINDOW FOR TRANSMITTING AND RECEIVING SYSTEM INFORMATION

TECHNICAL FIELD

The present disclosure relates to a wireless communication system. More particularly, the present disclosure relates to an apparatus and method for managing system information (SI) window in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system is being developed to meet the growing demand for high speed data services, support ultra-reliability and low latency applications.

The fifth generation wireless communication system will be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fourth generation wireless communication system, enhanced node B (eNB) or base station in cell broadcast system information. System information is structured into master information block (MIB) and a set of system information blocks (SIBs). MIB consists of System Frame Number (SFN), Downlink System bandwidth and Physical Hybrid ARQ Feedback Indicator Channel (PHICH) configuration. MIB is transmitted every 40 ms. It is repeated every 10 ms wherein the first transmission occurs in subframe #0 when SFM mod 4 equals zero. MIB is transmitted on physical broadcast channel. System Information Block Type 1 carries cell indemnity, tracking area code, cell barring information, value tag (common for all scheduling units), and scheduling information of other SIB s. SIB 1 is transmitted every 80 ms in subframe #5 when SFN mod 8 equals zero. SIB 1 is repeated in subframe#5 when SFN mod 2 equals zero. SIB 1 is transmitted on Physical downlink shared channel. Other SIBs (SIB 2 to SIB 19) are transmitted in System Information (SI) message wherein scheduling info of these SIBs are indicated in SIB 1.

DISCLOSURE OF INVENTION

Technical Problem

The fifth generation wireless communication system will consider frequency ranges up to 100 GHz. At higher frequencies, beamforming is essential to compensate for path loss. One transmission beam cannot provide the full cell coverage. Multiple transmission beams are needed. The current approach of transmitting an SI message using a SI window has following issues.

Larger SI window size is needed because of TX beamforming if NB or BS does not have enough hardware (i.e. antenna array) to transmit all the beams concurrently. One of the issues of broadcasting SI in beamformed system is that the transmission resources remaining after resources consumed by SI message transmission in each transmit time interval (e.g. subframe), may be only used for data scheduling for a user in the direction of the transmission beam used for SI message. Therefore user data scheduling becomes restrictive and inflexible in the transmit time intervals in which SI message is transmitted. Multiple SI windows leads to restrictive and inflexible scheduling in several transmit time intervals.

UE power consumption in acquiring the SI is also increased as UE has to monitor larger size SI window and hence more number of transmit time intervals.

This also leads to increased latency if there are several SI windows back to back and UE has to acquire all SI.

So enhanced method of transmitting and receiving system information is needed.

Solution to Problem

Aspects of the present disclosure are to address at least the above-mentioned problems and/or disadvantages and to provide at least the advantages described below.

Accordingly, an aspect of the present disclosure is to provide a method for managing system information (SI) window in a wireless communication system. The method comprise determining a plurality of SI messages to be transmitted at a time point, identifying a SI window number at the time point, and determining at least one of SI message among the plurality of SI messages, the at least one of SI message being included in a SI window corresponding to the SI window number.

According to an embodiment of the present invention, the time point may be a system frame number (SFN).

According to an embodiment of the present invention, the determining the at least one of SI message comprises identifying a first value (MaxCredits) indicating a max size of a SI that can be transmitted in a transmission time interval (TTI), identifying a second value (CreditCost) indicating a size of a SI message among the plurality of SI messages, and determining whether the SI message is included in the SI window corresponding to the SI window number based on the first value and the second value.

According to an embodiment of the present invention, the method for managing SI window further comprises if the first value is greater than the second value, selecting a first SI message, wherein the first SI message has largest size among SI messages having a size smaller than the first value, and determining that the first SI message is included in the SI window corresponding to the SI window number.

According to an embodiment of the present invention, the method for managing SI window further comprises identifying a third value (MaxCredits−CreditCost) indicating a remaining size of the SI that can be transmitted in the TTI, after the first SI message is included in the SI window, selecting a second SI message, wherein the second SI message has a size smaller than the remaining size, and determining that the second SI message is included in the SI window corresponding to the SI window number.

According to an embodiment of the present invention, the method for managing SI window further comprises determining at least one of SI message being included in another SI window corresponding to another SI window number, after at least one of SI messages included in the SI window corresponding to the SI window number are determined.

According to an embodiment of the present invention, the SI window number may be included in minimum SI or system information block 1 (SIB 1).

According to an embodiment of the present invention, the at least one of SI message may be identifyied based on the SI window number, periodicity of the at least one of SI message, and length of the at least one of SI message.

In accordance with an aspect of the present disclosure, an apparatus for managing system information (SI) window in a wireless communication system is provided. The apparatus comprises a transceiver, and a controller coupled with the transciver and configured to control to determine a plurality of SI messages to be transmitted at a time point, identify a SI window number at the time point, and determine at least one of SI message among the plurality of SI messages, the at least one of SI message being included in a SI window corresponding to the SI window number.

Advantageous Effects of Invention

In accordance with an aspect of the present disclosure, a method for managing system information (SI) window improves efficiency of user data scheduling, UE power consumption, and latency for acquiring SI.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and other aspects, features, and advantages of certain embodiments of the present disclosure will be more apparent from the following description taken in conjunction with the accompanying drawings, in which:

FIG. 1 illustrates transmission of two system information messages.

FIG. 2 illustrates a method for managing a system information (SI) window according to an embodiment of the present disclosure.

FIG. 3 illustrates an example for scheduling of a SI message transmission based on SI window number according to an embodiment of the present disclosure.

FIG. 4 illustrates a method for managing a SI window according to another embodiment of the present disclosure.

FIG. 5 illustrates a method for managing a SI window according to the other embodiment of the present disclosure.

FIG. 6 illustrates a method for managing a SI window according to the other embodiment of the present disclosure.

FIG. 7 illustrates a method for determining a SI message included in a SI window corresponding to a SI window number according to an embodiment of the present disclosure.

FIG. 8 illustrates a method for determining a SI message included in a SI window corresponding to a SI window number according to another embodiment of the present disclosure.

FIG. 9 illustrates a method for determining a SI message included in a SI window corresponding to a SI window number according to the other embodiment of the present disclosure.

FIG. 10 illustrates transmission of two SI messages when a SI message is transmitted using multiple TX beams according to an embodiment of the present disclosure.

FIG. 11 illustrates transmission of two SI messages when a SI message is transmitted using multiple TX beams according to another embodiment of the present disclosure.

FIG. 12 illustrates mapping between one or more DL TX beams and transmit time intervals (or slots or subframes) in SI-Window according to an embodiment of the present disclosure.

FIG. 13 illustrates one or more SIBs provided within some time window after sending the SI request according to an embodiment of the present disclosure.

FIG. 14 illustrates a SIB provided in SI window of nearest SI period when SI request is received for the SIB in its Nth SI period according to an embodiment of the present disclosure.

FIG. 15 illustrates a structure of a UE according to an embodiment of the present invention.

FIG. 16 illustrates a structure of a base station according to an embodiment of the present invention.

Throughout the drawings, like reference numerals will be understood to refer to like parts, components, and structures.

MODE FOR INVENTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIG. 1 illustrates transmission of two system information messages.

In legacy system SIBs (other than SIB 1) are carried in SI messages. SIB 1 indicates mapping of SIBs to SI messages. Each SIB is contained in only a single SI message. Only SIBs having the same periodicity can be mapped to the same SI message. The SI messages are transmitted within periodically occurring time domain SI-windows. The SI window comprises of one or more subframes wherein each subframe is of 1 ms duration. Each SI message is associated with a SI-window and the SI-windows of different SI messages do not overlap. Same SI message can be transmitted multiple times within a SI window. SIB 1 configures the SI-window length and the transmission periodicity for the SI messages. The SI-window length is same for all SI messages. FIG. 1 illustrates transmission of two SI messages i.e. SI message 1 and SI message 2 in legacy system. The SI message 1 and SI message 2 has the periodicity of 160 ms and 320 ms respectively. SI message 1 is transmitted in SI window 'W1' every 160 ms. SI message 2 is transmitted in SI window 'W2' every 320 ms. This approach of SI message transmission using SI window leads to increased latency if there are several SI windows back to back and UE has to acquire all SI.

In this invention we propose that multiple SI messages can be transmitted or multiplexed in a SI window. SI window is a set of TTIs or subframes or time slots. Depending on size of SI messages and periodicity of each SI messages, it is not possible to transmit all SI messages in the same SI window. Multiple SI windows are needed to transmit SI messages wherein one or more SI messages can be transmitted in the same SI window.

Embodiment 1

FIG. 2 illustrates a method for managing a system information (SI) window according to an embodiment of the present disclosure.

In one embodiment of the proposed invention, network (e.g. NB or BS) signals for each SI message a SI window number (or Mux-Tag or Mux-ID) say 'Wn'. Network (e.g. NB or BS) can signal for each SI message a SI window number in minimum system information (e.g. SIB1). Network can assign the same SI window number to multiple SI messages. The SI messages which are mapped to same SI window are assigned the same SI window number. Periodicity of each SI message and SI window length is also signaled by the network (e.g. NB or BS). This can be provided in broadcast signaling (e.g. in minimum system information i.e. SIB 1). It can also be provided in dedicated signaling (e.g. in response to UE's request or in handover command). Using SI window number, periodicity of SI message and SI window length, UE determines the SI window for receiving the SI message. The detailed operation is illustrated in FIG. 2 and explained below:

In step 210, the SI Window Number (or Mux-Tag or Mux-ID) 'Wn' for the concerned SI message (i.e. SI message which UE wants to receive) is determined. 'Wn' is signaled by the network (e.g. NB or BS) for each SI message. Periodicity of each SI message and SI window length is also signaled by the network (e.g. NB or BS).

In step 220, the integer value x=(Wn−1)*w is determined, where w is the SI Window Length signaled by the network (e.g. NB or BS) and Wn is as determined in step 210. Here it is assumed that Wn is greater than or equal to 1. However if Wn is greater than or equal to zero then determine the integer value x=(Wn)*w, where w is the SI Window Length signaled by the network (e.g. NB or BS). SI Window Length can be in units of subframes or slots or TTIs or duration of PDCCH Ocassions (i.e. interval at which PDCCH is scheduled).

In step 230, UE determines the start of SI window for the concerned SI message (i.e. SI message which UE wants to receive). SI-window starts at the subframe or slot or TTI #a, where a=x mod N1, in the radio frame for which SFN mod T=FLOOR(x/N1), where T is the periodicity of the concerned SI message; N1 is the number of subframes or slots or TTIs in a radio frame; SFN is the system frame number of a radio frame. The number of subframes or slots or TTIs in SI window is equal to SI Window Length. The subframes or slots or TTIs from the determined 'subframe or slot or TTI #a' to 'subframe or slot or TTI #a+SI Window Length' is the SI window for receiving the SI message.

Alternate 1: UE determines the start of SI window for the concerned SI message (i.e. SI message which UE wants to receive). SI-window starts at the subframe or slot or TTI #a, where a=x mod N1, in the radio frame for which (H_SFN*N2+SFN) mod T=FLOOR(x/N1), where T is the periodicity of the concerned SI message; N1 is the number of subframes or slots or TTIs in a radio frame, H_SFN is hyper radio frame number, SFN is the system frame number of a radio frame, N2 is number of radio frames in a hyper radio frame. The number of subframes or slots or TTIs in SI window is equal to SI Window Length. The subframes or slots or TTIs from the determined 'subframe or slot or TTI #a' to 'subframe or slot or TTI #a+SI Window Length' is the SI window for receiving the SI message.

Alternate 2: UE determines the start of SI window for the concerned SI message (i.e. SI message which UE wants to receive). SI-window starts at the subframe or slot or TTI #0, in the radio frame for which SFN mod T=FLOOR(x/N1)+offset, where T is the periodicity of the concerned SI message; N1 is the number of subframes or slots or TTIs in a radio frame; offset is the offset of the start of SI window; SFN is the system frame number of a radio frame. The offset can be pre-defined or signaled in provided in broadcast signaling (e.g. in minimum system information or SIB1) and/or in dedicated signaling (e.g. in response to UE's request or in handover command). The number of subframes or slots or TTIs in SI window is equal to SI Window Length.

Alternate 3: UE determines the start of SI window for the concerned SI message (i.e. SI message which UE wants to receive). SI-window starts at the subframe or slot or TTI #0, in the radio frame for which (H_SFN*N2+SFN) mod T=FLOOR(x/N1)+offset, where T is the periodicity of the concerned SI message; N1 is the number of subframes or slots or TTIs in a radio frame, H_SFN is hyper radio frame number, SFN is the system frame number of a radio frame, N2 is number of radio frames in a hyper radio frame, offset is the offset of the start of SI window. The offset can be pre-defined or signaled in provided in broadcast signaling (e.g. in minimum system information or SIB1) and/or in dedicated signaling (e.g. in response to UE's request or in handover command). The number of subframes or slots or TTIs in SI window is equal to SI Window Length.

In step 240, UE monitors the one or more subframes or slots or TTIs of determined SI window for receiving the concerned SI message.

FIG. 3 illustrates an example for scheduling of a SI message transmission based on SI window number according to an embodiment of the present disclosure.

FIG. 3 illustrates an example schedule of SI message transmission based on SI window number (or Mux-Tag or Mux-ID). SI messages, their periodicity and SI window number (or Mux-Tag or Mux-ID) as signaled by the network (e.g. NB or BS) are listed in table 1 below. Based on the proposed operation the schedule for SI messages is shown in FIG. 3.

TABLE 1

|  | SI Period | SI window number (or Mux-Tag or Mux-ID) |
| --- | --- | --- |
| SI Message 1 | 80 ms | 1 |
| SI Message 2 | 160 ms | 2 |
| SI Message 3 | 320 ms | 1 |
| SI Message 4 | 640 ms | 3 |
| SI Message 5 | 1280 ms | 2 |
| SI Message 6 | 2560 ms | 3 |

Embodiment 2

FIG. 4 illustrates a method for managing a SI window according to another embodiment of the present disclosure.

In one embodiment of the proposed invention, the network (e.g. NB or BS) signals for each SI message a one bit SI-Window-Flag (or Mux-Flag). Periodicity of each SI message and SI window length is also signaled by the network (e.g. NB or BS). The network (e.g. NB or BS) signals a list of one or more SI messages. This can be provided in broadcast signaling (e.g. in minimum system information or SIB1). It can also be provided in dedicated signaling (e.g. in response to UE's request or in handover command). The SI-Window-Flag bit for an SI message is set to '1' if it belongs to same SI window as the previous SI message in the list of SI messages. Otherwise it is set to zero. The SI-Window-Flag bit is set to zero for the first SI message in the list of SI messages. The SI messages which are mapped to same SI window are added in the list sequentially. Using SI-Window-Flag bit, periodicity of SI message and SI window length, UE determines the SI window for receiving each SI message. The detailed operation for receiving each SI message is illustrated in FIG. 4 and explained below:

In step 410, the Window Number 'Wn' for the concerned SI message (i.e. SI message which UE wants to receive) is determined using the SI-Window-Flag bit signaled for SI message. For example, let's say the list consists of 6 SI messages. The SI-Window-Flag bit is set as follows in the received list of SI messages, SI MSG 1 (flag=0); SI MSG2 (flag=1); SI MSG 3 (flag=1); SI MSG4 (flag=0); SI MSG5 (flag=1) and SI MSG4 (flag=0). SI MSG1 is the first SI message, so it belongs to first SI window. In this case SI MSG2 has same SI window as SI MSG1, SI MSG3 has same SI window as SI MSG 2 as the SI-Window-Flag bit is set to one for these SI messages. So SI MSG2 and SI MSG3 also belong to first SI window. SI MSG4 does not belong to same SI window as SI MSG3 as the SI-Window-Flag bit is set to zero. SI MSG5 has same SI window as SI MSG 4 as the SI-Window-Flag bit is set to one. So SI MSG 4 and SI MSG5 belong to second SI window. SI MSG 6 does not belong to same SI window as SI MSG5 as the SI-Window-Flag bit is set to zero. So SI MSG 6 belongs to third SI window.

In step 420, the integer value x=(Wn−1)*w is determined, where w is the si-WindowLength signaled by the network (e.g. NB or BS) and Wn is as determined in step 410. Here it is assumed that Wn is greater than or equal to 1. However if Wn is greater than or equal to zero then determine the integer value x=(Wn)*w, where w is the SI Window Length signaled by the network (e.g. NB or BS). SI Window Length can be in units of subframes or slots or TTIs or duration of PDCCH Ocassions (i.e. interval at which PDCCH is scheduled).

In step 430, UE determines the start of SI window for the concerned SI message (i.e. SI message which UE wants to receive). SI-window starts at the subframe or slot or TTI #a, where a=x mod N1, in the radio frame for which SFN mod T=FLOOR(x/N1), where T is the periodicity of the concerned SI message; N1 is the number of subframes or slots or TTIs in a radio frame; SFN is the system frame number of a radio frame. The subframes or slots or TTIs from the determined 'subframe or slot or TTI #a' to 'subframe or slot or TTI #a+SI Window Length' is the SI window for receiving the SI message.

Alternate 1: UE determines the start of SI window for the concerned SI message (i.e. SI message which UE wants to receive). SI-window starts at the subframe or slot or TTI #a, where a=x mod N1, in the radio frame for which (H_SFN*N2+SFN) mod T=FLOOR(x/N1), where T is the periodicity of the concerned SI message; N1 is the number of subframes or slots or TTIs in a radio frame, H_SFN is hyper radio frame number, SFN is the system frame number of a radio frame, N2 is number of radio frames in a hyper radio frame. The number of subframes or slots or TTIs in SI window is equal to SI Window Length. The subframes or slots or TTIs from the determined 'subframe or slot or TTI #a' to 'subframe or slot or TTI #a+SI Window Length' is the SI window for receiving the SI message.

Alternate 2: UE determines the start of SI window for the concerned SI message (i.e. SI message which UE wants to receive). SI-window starts at the subframe or slot or TTI #0, in the radio frame for which SFN mod T=FLOOR(x/N1)+offset, where T is the periodicity of the concerned SI message; N1 is the number of subframes or slots or TTIs in a radio frame; SFN is the system frame number of a radio frame; offset is the offset of the start of SI window. The offset can be pre-defined or signaled in provided in broadcast signaling (e.g. in minimum system information or SIB1) and/or in dedicated signaling (e.g. in response to UE's request or in handover command). The number of subframes or slots or TTIs in SI window is equal to SI Window Length.

Alternate 3: UE determines the start of SI window for the concerned SI message (i.e. SI message which UE wants to receive). SI-window starts at the subframe or slot or TTI #0, in the radio frame for which (H_SFN*N2+SFN) mod T=FLOOR(x/N1)+offset, where T is the periodicity of the concerned SI message; N1 is the number of subframes or slots or TTIs in a radio frame, H_SFN is hyper radio frame number, SFN is the system frame number of a radio frame, N2 is number of radio frames in a hyper radio frame, offset is the offset of the start of SI window. The offset can be pre-defined or signaled in provided in broadcast signaling (e.g. in minimum system information or SIB1) and/or in dedicated signaling (e.g. in response to UE's request or in handover command). The number of subframes (or TTIs) in SI window is equal to SI Window Length.

In step 440, UE monitors the subframes or slots or TTIs of determines SI window for receiving the SI message.

Embodiment 3

FIG. 5 illustrates a method for managing a SI window according to the other embodiment of the present disclosure.

In one embodiment of the proposed invention, the network (e.g. NB or BS) signals a list of list of SI messages. Each SI message in list of SI messages belongs to same SI window and the SI window number of each SI message is the order of that list of SI message to which the SI message belongs in list of SI messages. Periodicity of each SI message and SI window length is also signaled by the network (e.g. NB or BS). This can be provided in broadcast signaling (e.g. in minimum system information or SIB1). It can also be provided in dedicated signaling (e.g. in response to UE's request or in handover command). Using list of list of SI messages, periodicity and SI window length, UE determines start of SI window for receiving each SI message. The detailed operation for receiving each SI message is illustrated in FIG. 5 and explained below:

In step 510, the Window Number 'Wn' for the concerned SI message is determined using the list of list of SI messages. All SI messages in first list of SI messages belongs to SI window 1, all SI messages in second list of SI messages belongs to SI window 2 and so on. In an alternate embodiment, all SI messages in first list of SI messages belongs to SI window 0, all SI messages in second list of SI messages belongs to SI window 1 and so on.

In step 520, the integer value x=(Wn−1)*w is determined, where w is the si-WindowLength signaled by the network (e.g. NB or BS) and Wn is as determined in step 510. Here it is assumed that Wn is greater than or equal to 1. However if Wn is greater than or equal to zero then determine the integer value x=(Wn)*w, where w is the SI Window Length signaled by the network (e.g. NB or BS). SI Window Length can be in units of subframes or slots or TTIs or duration of PDCCH Ocassions (i.e. interval at which PDCCH is scheduled).

In step 530, UE determines the start of SI window for the concerned SI message (i.e. SI message which UE wants to receive). SI-window starts at the subframe or slot or TTI #a, where a=x mod N1, in the radio frame for which SFN mod T=FLOOR(x/N1), where T is the periodicity of the concerned SI message; N1 is the number of subframes or slots or TTIs in a radio frame, SFN is the system frame number of a radio frame. The number of subframes or slots or TTIs in SI window is equal to SI Window Length. The subframes or slots or TTIs from the determined 'subframe or slot or TTI #a' to 'subframe or slot or TTI #a+SI Window Length' is the SI window for receiving the SI message.

Alternate 1: UE determines the start of SI window for the concerned SI message (i.e. SI message which UE wants to receive). SI-window starts at the subframe or slot or TTI #a, where a=x mod N1, in the radio frame for which (H_SFN*N2+SFN) mod T=FLOOR(x/N1), where T is the periodicity of the concerned SI message; N1 is the number of subframes or slots or TTIs in a radio frame, H_SFN is hyper radio frame number, SFN is the system frame number of a radio frame, N2 is number of radio frames in a hyper radio frame. The number of subframes or slots or TTIs in SI window is equal to SI Window Length. The subframes or slots or TTIs from the determined 'subframe or slot or TTI #a' to 'subframe or slot or TTI #a+SI Window Length' is the SI window for receiving the SI message.

Alternate 2: UE determines the start of SI window for the concerned SI message (i.e. SI message which UE wants to receive). SI-window starts at the subframe or slot or TTI #0, in the radio frame for which SFN mod T=FLOOR(x/N1)+offset, where T is the periodicity of the concerned SI message; N1 is the number of subframes or slots or TTIs in a radio frame; SFN is the system frame number of a radio frame; offset is the offset of the start of SI window. The offset can be pre-defined or signaled in provided in broadcast signaling (e.g. in minimum system information or SIB1) and/or in dedicated signaling (e.g. in response to UE's request or in handover command). The number of subframes or slots or TTIs in SI window is equal to SI Window Length.

Alternate 3: UE determines the start of SI window for the concerned SI message (i.e. SI message which UE wants to receive). SI-window starts at the subframe or slot or TTI #0, in the radio frame for which (H_SFN*N2+SFN) mod T=FLOOR(x/N1)+offset, where T is the periodicity of the concerned SI message; N1 is the number of subframes or TTIs or slots in a radio frame, H_SFN is hyper radio frame number, SFN is the system frame number of a radio frame, N2 is number of radio frames in a hyper radio frame, offset is the offset of the start of SI window. The offset can be pre-defined or signaled in provided in broadcast signaling (e.g. in minimum system information or SIB1) and/or in dedicated signaling (e.g. in response to UE's request or in handover command). The number of subframes or slots or TTIs in SI window is equal to SI Window Length.

In step 540, UE monitors the subframes or TTIs or slots of determines SI window for receiving a SI message.

In embodiments 1, 2 and 3, multiple SI messages can be mapped to same SI window. The mapping between SI messages and SI window is fixed i.e. SI message is transmitted in same SI window every SI period. However in some cases this is not an optimal design. Consider for example four SI messages with different SI periods and SI message sizes, as follows:

SImsg 1: SI period=80 ms; SI Message Size=600 bis
SImsg 2: SI period=160 ms; SI Message Size=200 bits
SImsg 3: SI period=320 ms; SI Message Size=400 bits
SImsg 4: SI period=640 ms; SI Message Size=800 bits Let's assume that in a TTI max of 1000 bits of SI information can be transmitted. In this case having fixed mapping between a SI window and SI message is not optimal. For optimal design, at t=640, 1280, 1920, . . . and so on, SImsg 1 and SImsg 3 should be transmitted in SI window 1; SImsg 2 and SImsg 4 should be transmitted in SI window 2. At t=160, 320, 480, 800, and so on, SImsg 1 and SImsg 2 should be transmitted in SI Window 1. SImsg 1 and SImsg 2 are mapped to different SI window at different times. Embodiment 4 and 5 provided detail operation for the methods in which SI message can be mapped to different SI window at different times.

Embodiment 4

FIG. 6 illustrates a method for managing a SI window according to the other embodiment of the present disclosure.

In one embodiment of the proposed invention, the network (e.g. NB or BS) signals for each SI message a list of one or more {window number (Wn or Mux-Tag or Mux-ID), period (T)}. This can be provided in broadcast signaling (e.g. in minimum system information or SIB1). It can also be provided in dedicated signaling (e.g. in response to UE's request or in handover command). Using list of one or more {window number (or Mux-Tag or Mux-ID), period} for the SI message, and SI window length, UE determines the SI window for receiving the SI message. The detailed operation is illustrated in FIG. 6 and explained below:

In step 610, the SI Window Number (or Mux-Tag or Mux-ID) 'Wn' and period T for the concerned SI message is determined. One or multiple sets of {Wn, T} are signaled by the network (e.g. NB or BS) for each SI message. Wn is SI window number and T is the period. If there is only set of {Wn, T} is signaled by the network (e.g. NB or BS) for the concerned SI message than SI Window number and period is Wn and T corresponding to that set. If multiple sets of {Wn, T} are signaled then select the set of {Wn, T) for which SFN mod T equals zero. If SFN mod T equals zero for values of T from multiple sets then choose set {Wn, T) which has larger value of T. For example, let's say two sets {Wn=1, T=80 ms} and {Wn=2, T=160 ms} are signaled. If SFN mode T equals zero for both T=80 ms and T=160 ms then second set i.e. {Wn=2, T=160 ms} is selected as T=160 ms is greater than T=80 ms. SFN is the system frame number. Each radio frame has a SFN. In a SFN cycle are sequentially numbered starting with SFN 0.

Alternate 1: For a SI message, UE sorts the signaled values of T in descending order. UE checks whether SFN mod T equals zero for each value of T, starting with highest value of T, until SFN mod T equals zero or until all values of T have been checked. If SFN mod T equals zero for a T, then UE select that T and corresponding Wn.

In step 620, the integer value x=(Wn−1)*w is determined, where w is the si-WindowLength signaled by the network (e.g. NB or BS). Wn is SI window number determined in step 1 for the concerned SI message (i.e. SI message which UE wants to receive). Here it is assumed that Wn is greater than or equal to 1. However if Wn is greater than or equal to zero then determine the integer value x=(Wn)*w, where w is the SI Window Length signaled by the network (e.g. NB or BS). SI Window Length can be in units of subframes or slots or TTIs or duration of PDCCH Ocassions (i.e. interval at which PDCCH is scheduled).

In step 630, UE determines the start of SI window for the concerned SI message (i.e. SI message which UE wants to receive). SI-window starts at the subframe or slot or TTI #a, where a=x mod N1, in the radio frame for which SFN mod T=FLOOR(x/N1), where T is the periodicity of the concerned SI message, determined in step 1; N1 is the number of subframes or slots or TTIs in a radio frame; SFN is the system frame number of a radio frame. The number of subframes or slots or TTIs in SI window is equal to SI Window Length. The subframes or slots or TTIs from the determined 'subframe or slot or TTI #a' to 'subframe or slot or TTI #a+SI Window Length' is the SI window for receiving the SI message.

Alternate 1: UE determines the start of SI window for the concerned SI message (i.e. SI message which UE wants to receive). SI-window starts at the subframe or slot or TTI #a, where a=x mod N1, in the radio frame for which (H_SFN*N2+SFN) mod T=FLOOR(x/N1), where T is the periodicity of the concerned SI message; N1 is the number of subframes or slots or TTIs in a radio frame, H_SFN is hyper radio frame number, SFN is the system frame number of a radio frame, N2 is number of radio frames in a hyper radio frame. The number of subframes or slots or TTIs in SI window is equal to SI Window Length. The subframes or slots or TTIs from the determined 'subframe or slot or TTI #a' to 'subframe or slot or TTI #a+SI Window Length' is the SI window for receiving the SI message.

Alternate 2: UE determines the start of SI window for the concerned SI message (i.e. SI message which UE wants to receive). SI-window starts at the subframe or slot or TTI #0, in the radio frame for which SFN mod T=FLOOR(x/N1)+offset, where T is the periodicity of the concerned SI message; N1 is the number of subframes or slots or TTIs in a radio frame; SFN is the system frame number of a radio frame; offset is the offset of the start of SI window. The offset can be pre-defined or signaled in provided in broadcast signaling (e.g. in minimum system information or SIB1) and/or in dedicated signaling (e.g. in response to UE's request or in handover command). The number of subframes or slots or TTIs in SI window is equal to SI Window Length.

Alternate 3: UE determines the start of SI window for the concerned SI message (i.e. SI message which UE wants to receive). SI-window starts at the subframe or slot or TTI #0, in the radio frame for which (H_SFN*N2+SFN) mod T=FLOOR(x/N1)+offset, where T is the periodicity of the concerned SI message; N1 is the number of subframes or slots or TTIs in a radio frame, H_SFN is hyper radio frame number, SFN is the system frame number of a radio frame, N2 is number of radio frames in a hyper radio frame, offset is the offset of the start of SI window. The offset can be pre-defined or signaled in provided in broadcast signaling (e.g. in minimum system information or SIB1) and/or in dedicated signaling (e.g. in response to UE's request or in handover command). The number of subframes or slots or TTIs in SI window is equal to SI Window Length.

In step 640, UE monitors the subframes or slots or TTIs of determined SI window for receiving the concerned SI message.

Embodiment 5

FIG. 7 illustrates a method for determining a SI message included in a SI window corresponding to a SI window number according to an embodiment of the present disclosure.

Network (e.g. BS or NB) signals "MaxCredits" available in each SI broadcast TTI or SI window. MaxCredits can be max bytes of SI that can be transmitted in a TTI or SI Window. For each SI message, the network (e.g. BS or NB) also signals a "CreditCost". The CreditCost can be size of SI message. These can be provided in broadcast signaling (e.g. in minimum system information or SIB1). It can also be provided in dedicated signaling (e.g. in response to UE's request or in handover command). Network and UE operation for each scheduling occasion is as follows (see FIG. 7):

In step 701, the total set of SI messages to be transmitted at this occasion (e.g. SFN) is determined. An SI message is transmitted at this occasion if SFN mod T=0 where T is the periodicity of SI message.

In step 703, Set Wx=1, where Wx denotes the SI window number.

In step 705, Set WxCredits=MaxCredits

In step 707, Take the first/next SI message from set of SI messages determined in step 1 for which no window Wx is determined and place it in SI Window with SI Window number Wx and calculate WxCredits=WxCredits−CreditCost. Alternately, Out of the remaining SI messages (i.e. for which no window Wx is determined yet) to be transmitted at this occasion, take the SI message with the largest credit cost and place it in SI Window with SI Window number Wx and calculate WxCredits=WxCredits−CreditCost.

In step 709, whether WxCredits equals zero is determined. If WxCredits equals zero go to step 717, otherwise go to step 711. In an alternate embodiment step 707 can be skipped after step 705.

In step 711, Out of the SI messages from set of SI messages determined in step 701 for which no window Wx is determined yet, determine the SI message with the largest credit cost for which WxCredits−CreditCost>=0.

In step 713 and 715, if such SI message is found, place it in SI Window with SI Window number Wx and calculate WxCredits=WxCredits−CreditCost. If WxCredits equals zero go to step 717 otherwise repeat step 711. If such SI message is not found, go to Step 717.

In step 717 and 719, if SI window number Wx for each SI message to be scheduled at this occasion is not determined, set Wx=Wx+1 and go to step 705. Otherwise go to step 721.

Embodiment 6

FIG. 8 illustrates a method for determining a SI message included in a SI window corresponding to a SI window number according to another embodiment of the present disclosure.

Network (e.g. BS or NB) signals "MaxCredits" available in each SI broadcast TTI. MaxCredits can be max bytes of SI that can be transmitted in a TTI. For each SI message, the network (e.g. BS or NB) also signals a "CreditCost". The CreditCost can be size of SI message. These can be provided in broadcast signaling (e.g. in minimum system information or SIB 1). It can also be provided in dedicated signaling (e.g. in response to UE's request or in handover command). Network and UE operation for each scheduling occasion is as follows (see FIG. 8):

In step 801, the total set of SI messages to be transmitted at this occasion (e.g. SFN) is determined. An SI message is transmitted at this occasion if SFN mod T=0 where T is the periodicity of SI message.

In step 803, set Wx=1, where Wx denotes the SI window number.

In step 805, set WxCredits=MaxCredits

In step 807, take the first/next SI message for which no window Wx is determined from set of SI messages determined in step 1 and place it in SI Window with SI Window number Wx and calculate WxCredits=WxCredits−CreditCost. Alternately, Out of the remaining messages (i.e. for which no window Wx is determined yet) to be transmitted at this occasion, take the SI message with the largest credit cost and place it in SI Window with SI Window number Wx and calculate WxCredits=WxCredits−CreditCost. In an alternate embodiment step 807 can be skipped after step 805.

In step 809, Out of the SI messages for which no window Wx is determined yet, determine the SI message with the largest credit cost for which WxCredits−CreditCost>=0.

In step 811 and 813, if such SI message is found, place it in SI Window with SI Window number Wx and calculate WxCredits=WxCredits−CreditCost. Repeat Step 809. In step 811, if such SI message is not found, go to Step step 815.

In step 815 and 817, if SI window number Wx for each SI message to be scheduled at this occasion is not determined, set Wx=Wx+1 and go to step 805. Otherwise go to step 819.

Embodiment 7

FIG. 9 illustrates a method for determining a SI message included in a SI window corresponding to a SI window number according to the other embodiment of the present disclosure.

Network (e.g. BS or NB) signals "MaxCredits" available in each SI broadcast TTI. MaxCredits can be max bytes of SI that can be transmitted in a TTI. For each SI message, the network (e.g. BS or NB) also signals a "CreditCost". The CreditCost can be size of SI message. These can be provided in broadcast signaling (e.g. in minimum system information or SIB 1). It can also be provided in dedicated signaling (e.g. in response to UE's request or in handover command). Network and UE operation for each scheduling occasion is as follows (see FIG. 9):

In step 901, the total set of SI messages to be transmitted at this occasion (e.g. SFN) is determined. An SI message is transmitted at this occasion if SFN mod T=0 where T is the periodicity of SI message.

In step 903, set Wx=1, where Wx denotes the SI window number.

In step 905, set WxCredits=MaxCredits

In step 907, Out of the SI messages for which no window Wx is determined yet from the set of SI messages determined in step 1, determine the SI message with the largest credit cost for which WxCredits−CreditCost>=0.

In step 909 and 911, if such SI message is found, place it in SI Window with SI Window number Wx and calculate WxCredits=WxCredits−CreditCost. Repeat Step 907. In step 909, if such SI message is not found, go to step 913.

In step 913 and 915, if SI window number Wx for each SI message to be scheduled at this occasion is not determined, set Wx=Wx+1 and go to step 905. Otherwise go to step 917.

Combining TBs of SI Message From Multiple SI Windows

Within a SI window, a SI message can be repeatedly transmitted. UE may accumulate these transmissions for decoding SI message. If the SI message was not possible to decode from the accumulated SI message transmissions by the end of the SI-window, UE continues reception and accumulation of SI message transmissions in the next SI-window occasion for the concerned SI message. Since multiple SI messages can be transmitted in same SI window, there will be multiple transport blocks (one for each SI message mapped to same SI window) scheduled in SI window. UE needs to identify the TB corresponding to concerned SI message so that it can combine it with TB for the same concerned SI message received in previous SI window occasion.

Option 1: Since multiple SI messages can be transmitted in same SI window, UE identifies the transmission of concerned SI message in the SI window based on SI RNTI used for masking CRC of PDCCH or information in decoded PDCCH. The CRC of PDCCH can be masked with SI-RNTI specific to SI message. The SI-RNTI specific to SI message can be signaled in system information (e.g. in SIB1). UE may monitor for multiple SI-RNTIs in SI occasions in which multiple SI messages are transmitted.

Option 2: Each SI message is indexed; say 0, 1, 2, 3 . . . and so on. The index can be the order of SI message in list of SI messages in minimum system information or SIB 1. Alternately index can be the order of SI messages in list of SI messages mapped to same SI window. The index of SI message can be included in DCI. In an embodiment, index can be included in HARQ process number and/or NDI field in DCI.

Option 3: Since multiple SI messages can be transmitted in same SI window, for UE to identify the transmission of concerned SI message in the next SI window, the SI message can be transmitted in same time/frequency resources in each SI window in which that SI message is transmitted.

Option 4: Transport block received in multiple SI window occasions which are scheduled using same SI-RNTI are combined by UE for decoding.

All the system information block(s) or SI message(s) may not be combined across multiple SI Windows. The system information block(s) or SI message(s) which can be combined across multiple SI Windows can be pre-defined. Alternately it can be signaled by network in broadcast.

Selective Reception of SI Messages Transmitted in Same SI Window

If multiple SI messages are transmitted in same SI Window then UE has to receive all SI messages and then UE discards the SI messages in which it is not interested. This leads to unnecessary UE power consumption. There are several approaches to reduce the UE power consumption.

Embodiment 1: Each SI message is transmitted as an independent MAC PDU. PHY PDU and PDCCH are independent for each SI message. SI messages transmitted in same SI window are mapped to different SI RNTI. UE monitors the scheduling control channel (i.e. (E) PDCCH) only for the SI-RNTI(s) of SI message(s) in which UE is interested in the SI window. SI RNTI for each SI message can be indicated in one of the following ways:

Option 1: SI-RNTI for each SI message can be explicitly signaled by the network (i.e. BS or NB).SI-RNTI for each SI message can be explicitly signaled by the network (i.e. BS or NB) in minimum system information (e.g. SIB 1).

Option 2: SI-RNTI=x for first SI message is explicitly signaled by the network (i.e. BS or NB). The SI-RNTI for second SI message is SI RNTI=x+1, SI-RNTI for third SI message is SI RNTI=x+2, and so on.

Option 3: SI-RNTI=x is pre-defined. The SI-RNTI for first SI message is SI RNTI=x. The SI-RNTI for second SI message is SI RNTI=x+1, SI-RNTI for third SI message is SI RNTI=x+2, and so on.

In the above listed options, SI-RNTI can be assigned to each SI message in list of SI messages in minimum system information (or SIB 1). Alternately SI-RNTI can be assigned to SI messages in list of SI messages mapped to same SI window.

Embodiment 2: Mux the different SI messages that happen to be scheduled at the same time in one TB (i.e. PHY PDU) with one PDCCH/SI-RNTI. Within the TB, SI messages are multiplexed as independent MAC SDU. Each SI message is mapped to different logical channel ID. SI messages transmitted in same SI window are mapped to different LCID. Based on LCID, UE can identify the MAC SDU corresponding to an SI message. If UE is not interested in a SI message then UE can discard the MAC SDU corresponding to that SI message.

Option 1: LCID for each SI message can be explicitly signaled by the network (i.e. BS or NB).

Option 2: LCID=X for only first SI message is explicitly signaled by the network (i.e. BS or NB). The LCID for second SI message is LCID=x+1, LCID for third SI message is LCID=x+2, and so on.

Option 3: LCID=x is pre-defined. The LCID for first SI message is LCID=x. The LCID for second SI message is LCID=x+1, LCID for third SI message is LCID=x+2, and so on.

In the above listed options, the LCID can be assigned to each SI message in list of SI messages in minimum system information. Alternately LCID can be assigned to SI messages in list of SI messages mapped to same SI window.

Embodiment 3: Each SI message is transmitted as an independent MAC PDU. PHY PDU and PDCCH are independent for each SI message but SI-RNTI is same for all SI messages. PDCCHs for SI messages can be mapped to different frequency resource in same SI window. The frequency resource (e.g. PDCCH region) for monitoring PDCCH for an SI message or set of SI messages can be signaled by the network. If UE is interested in a certain SI message then it monitors for PDCCH using SI-RNTI in specific frequency resource (or PDCCH region).

Beamforming Aspects of SI Window Management

FIG. 10 illustrates transmission of two SI messages when a SI message is transmitted using multiple TX beams according to an embodiment of the present disclosure.

The fifth generation wireless communication system will consider frequency ranges up to 100 GHz. At higher frequencies, beamforming is essential to compensate for path loss. One transmission beam cannot provide the full cell coverage. Multiple transmission beams are needed. FIG. 10 shows SI message transmission in SI transmission window in a beamformed system wherein there is one to one mapping between SI window and SI message. FIG. 10 illustrates transmission of two SI messages i.e. SI message 1 and SI message 2. The SI message 1 and SI message 2 has the periodicity of 160 ms and 320 ms respectively. SI message 1 is transmitted in SI window 'W1' every 160 ms. SI message 2 is transmitted in SI window 'W2' every 320 ms. In each SI window, SI message is transmitted using multiple TX beams. The SI window comprises of multiple transmit time intervals. One or multiple TX beams can be used transmit SI message in a transmit time interval in SI window. In the FIG. 10, one TX beam is used to transmit in each transmit time interval of SI window.

Transmission of one SI message in one SI window leads to restrictive and inflexible scheduling in several transmit time intervals, increased UE power consumption and increased latency to acquire SI. To overcome this problem we propose that multiple SI messages can be mapped to same SI window.

FIG. 11 illustrates transmission of two SI messages when a SI message is transmitted using multiple TX beams according to another embodiment of the present disclosure.

FIG. 11 shows SI message transmission in SI transmission window in a beamformed system wherein there is one to many mapping between SI window and SI message. FIG. 11 illustrates transmission of two SI messages i.e. SI message 1 (M1) and SI message 2 (M2). The SI message 1 and SI message 2 has the periodicity of 160 ms and 320 ms respectively. Both SI message 1 and SI message 2 are transmitted in SI window 'W1'. At SI period starting at T=n*320 ms where n=0, 1, 2, and so on, SI Window W1 carries both SI message 1 and SI message 2. At other SI periods SI window 'W1' only carries SI message 1.

SI Message Reception in SI Window

In case of beamformed system, SI message is transmitted using one or more beams in each transmit time interval of corresponding SI Window. If UE is not aware of the DL TX beam(s) used to transmit SI message in a transmit time interval then UE has to monitor all the transmit time intervals of SI window. Given that SI window in case of beamformed system can be larger than in case of non beamformed system monitoring all the transmit time intervals of SI window is not desirable from point of view of UE's power consumption.

UE power consumption can be reduced if UE can determine the best/suitable DL TX beam (or SS block) using the broadcast signals such NR-PSS/SSS/PBCH and then monitors the transmit time interval(s) or subframe(s) or slot(s) in SI window corresponding to the best/suitable DL TX beam (or SS block). Each transmission occasion of NR-PSS/SSS/PBCH is referred as a SS block and each SS block is identified by a SS block ID. NR-PSS/SSS/PBCH can be transmitted using one or more SS blocks. Each SS block can be transmitted using one or more DL TX beams. The best DL TX beam or SS block is the SS block with measured SS block RSRP highest amongst all the measured SS blocks. The suitable DL TX beam or SS block is the SS block with measured SS block RSRP above a threshold (threshold can be pre-defined or signaled in system information e.g. in SIB1 or MIB). This approach requires that UE knows the mapping between one or more DL TX beams (or SS blocks) and transmit time intervals or subframe(s) or slot(s) in SI Window. Mapping between the transmit time intervals or subframe(s) or slot(s) in SI window and DL TX beams (SS blocks) can be explicitly signaled (e.g. in system information) to UE.

FIG. 12 illustrates mapping between one or more DL TX beams (SS blocks) and transmit time intervals (or slots or subframes) in SI-Window according to an embodiment of the present disclosure.

The mapping between one or more DL TX beams (or SS blocks) and transmit time intervals (or slots or subframes) in SI-Window can be implicit. The order in which TX beams are used for transmission of NR-PSS/SSS/BCH is same as order in which TX beams are used for transmission of SI message in SI Window. This is shown in FIG. 12. For example, if best/suitable DL TX beam or SS block is TX5, then UE monitors only SF4 (or slot4 or TTI4) for receiving SI message in SI window. UE monitors the broadcast signals such as NR-PSS/SSS/BCH anddetermine the best/suitable DL TX beam (or SS block). For SI message reception, UE monitors the transmit time interval(s) (or slots or subframes) in SI window corresponding to the determined DL TX beam (or SS block).

Alternately if UE is able to receive PSS/SSS/PBCH in slot 4 amongst the PSS/SSS/PBCH slots, UE monitors SF4 (or slot4 or TTI4) in SI window. Alternately, there can be one to one mapping between PSS/SSS/PBCH slot or SS block and time slot (subframe or TTI) of SI window. There can be one to many mapping between PSS/SSS/PBCH slot or SS block and time slots (subframe or TTI) of SI window. If UE is able to receive PSS/SSS/PBCH in slot x or SS block X amongst the PSS/SSS/PBCH slots or SS blocks then UE monitor corresponding time slots (based on mapping) in SI window. The mapping can also be referred as QCL between PSS/SSS/PBCH or SS block transmissions and SI transmissions.

One example of mapping between PSS/SSS/PBCH slot or SS block and time slots (subframe or TTI) of SI window is as follows:

Time slots in SI window corresponding to PSS/SSS slot or SS block Sj is given by 'j*i+n for all n, where i=(number of slots in SI window)/(number of PSS/SSS slots or SS blocks);

n=0, 1, . . . i−1 j=0, 1, . . . Number of PSS/SSS slots or SS blocks−1

Another example of mapping is as follows:

Time slots in SI window corresponding to PSS/SSS slot or SS block Sj is given by j+i*P for all P, where i=(number of slots in SI window)/(number of PSS/SSS slots or SS blocks);

P=0, 1, . . . number of PSS/SSS slots or SS blocks−1 j=0, 1, . . . Number of PSS/SSS slots or SS blocks−1

In another embodiment, mapping between PSS/SSS slots or SS blocks and slots in SI window can be explicitly signaled in minimum system information (e.g. SIB 1). For each PSS/SSS slots or SS block ID, list of indexes of one or more slots in SI window can be signaled. Alternately, for each slot in SI window, list of indexes of one or more PSS/SSS slots or SS block ID can be signaled.

SI Response Reception Mechanism

After receiving the SI request, the one or more SIBs requested by UE can be provided to UE as follows:

Approach 1: Independent of SI scheduling framework

FIG. 13 illustrates one or more SIBs provided within some time window after sending the SI request according to an embodiment of the present disclosure.

In this approach the one or more SIBs requested by UE are provided within some time window (i.e. SI Response Window) after sending the SI request as shown in FIG. 13. After sending the SI request the UE listens to NR-PDCCH in SI Response Window for receiving the requested SIBs. If UE does not receive the requested SIBs within the SI Response Window then UE may retransmit the SI request. The length of SI response window can be provided in minimum system information. The SI response window can start at fixed time (e.g. N time slots, where N can be predefined or signaled by network) from the time slot in which SI request is transmitted. The SI response window can be occurring at periodic interval configured by the network. In this case the nearest SI response window which is at least 'x' ms away from the SI request is used for transmitting/receiving the SI response.

Approach 2: As part of SI scheduling framework

FIG. 14 illustrates a SIB provided in SI window of nearest SI period when SI request is received for the SIB in its Nth SI period according to an embodiment of the present disclosure.

The scheduling information for other SI includes SIB type, validity information, periodicity, SI-window information in minimum SI irrespective of whether Other SI is periodically broadcasted or provided on demand. If minimum SI indicates that a SIB is provided on demand, then the UE cannot assume this SIB is broadcasted in its SI-Window every SI-Period and therefore the UE should send an SI request to receive this SIB. If the SI request is received then this SIB is provided in SI window of some SI periods.

The number of SI periods can be configured by network. After sending the SI request, for receiving the requested SIB, UE monitors the SI window of requested SIB in one or more SI periods of that SIB. As shown in FIG. 13 below, if SI request is received for a SIB in its Nth SI period, then requested SIB is provided in SI window of nearest SI period (N+1th SI Period or N+2th SI Period), which is at least 'x' ms away from the SI request. Each SIB or set of SIB s is identified by an ID.

The ID consists of two parts area identifier and an index. If there is a change in ID UE requests the associated system information or obtains the associated system information from broadcast signaling. Broadcasting in minimum SI the ID for each SI-block is not preferable from signaling overhead point of view.

Option 1: Therefore, in one embodiment the complete ID (X bits) is transmitted for the first SI-block. For the remaining SI-block(s) available in the cell only the index or N LSBs of ID is transmitted. To know the complete ID of an SI block, UE adds the X-N MSBs of ID of first SI block to N LSBs of ID of that SI block.

Option 2: In another embodiment, M MSBs of ID is transmitted in min SI. For each SI block, N LSBs of ID is transmitted. N can be same for each SI block or it can be different. To know the complete ID of an SI block, UE adds the M MSBs of ID and N LSBs of ID of that SI block.

Determination of Redundancy version for SI message in SI window:

In an embodiment, if a downlink assignment has been received on the PDCCH for the SI-RNTI in a PDCCH ocassion and if the redundancy version is not defined in the PDCCH format then UE determines the redundancy version of the received downlink assignment for the PDCCH ocassion by $RV_K=\text{ceiling}(3/2*k)$ modulo 4, where k for SystemInformation messages is given by, k=i modulo 4, i=0, 1, ..., si-WindowLength−1, where i denotes the slot number within the SI window.

In an alternate embodiment, if a downlink assignment has been received on the PDCCH for the SI-RNTI in a PDCCH ocassion and if the redundancy version is not defined in the PDCCH format then UE determines the redundancy version of the received downlink assignment for the PDCCH ocassion by $RV_K=\text{ceiling}(3/2*k)$ modulo 4, where k for SystemInformation messages is given by, k=(i/n) modulo 4, i=0, 1, ..., si-WindowLength−1, where i denotes the slot number within the SI window and 'n' is the number of time slots used for TX beam sweeping or 'n' is the number of SS blocks or 'n' is the number of actually transmitted SS blocks. The value of 'n' can be configured in the minimum system information (e.g. MIB or SIB 1).

FIG. 15 illustrates a structure of a UE according to an embodiment of the present invention Referring to FIG. 15, the UE may include a transceiver(or transmission/reception unit 1510), a controller (1520), and a storage unit (1530). In the present invention, controller (1520) may be defined as a circuit or an application specific integrated circuit or at least one processor.

Transceiver (1510) may transmit and receive signals with other network entities. Transceiver(1510) may receive system information from, for example, a base station and may receive a synchronization signal or a reference signal.

Controller (1520) may control the overall operation of the UE according to the embodiment of the present invention. For example, Controller (1520) may control the signal flow between each block to perform the operation according to the flowcharts described above. In detail, controller (1520) may control operations proposed by the present invention to receive a system information message and determine subframe or slot or TTI to monitor.

Storage unit (1530) may store at least one of information transmitted and received through the transceiver (1510) and information generated through controller (1520).

FIG. 16 illustrates a structure of a base station according to an embodiment of the present invention.

Referring to FIG. 16, the base station may include a transceiver (transmission/reception unit 1610), a controller (1620), and a storage unit (1630). In the present invention, controller (1620) may be defined as a circuit or an application specific integrated circuit or at least one processor.

Transceiver (1610) may transmit and receive signals with other network entities.

Transceiver (1610) may transmit system information to the UE, for example, and may transmit a synchronization signal or a reference signal.

Controller (1620) may control the overall operation of the base station according to the embodiment of the present invention. For example, controller (1620) may control the signal flow between each block to perform the operation according to the flowcharts described above. In particular, controller (1620) may control operations proposed by the present invention to determine at least one of SI message among the plurality of SI messages, the at least one of SI message being included in a SI window corresponding to the SI window number.

The storage unit (1630) may store at least one of information transmitted/received through transceiver (1610) and information generated through the controller (1620).

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for managing a system information (SI) window in a wireless communication system, the method comprising:
   determining a plurality of SI messages to be transmitted;
   identifying a SI window number; and
   determining at least one SI message among the plurality of SI messages, the at least one SI message being included in a SI window corresponding to the SI window number,
   wherein the determining the at least one SI message comprises:
      identifying a first value indicating a maximum size of SI that can be transmitted in the SI window corresponding to the SI window number,
      identifying a second value indicating a size of a SI message among the plurality of SI messages,
      in case that the first value is greater than the second value of a first SI message, selecting the first SI message, wherein the first SI message has a largest size among SI messages having a size smaller than the first value, and
      determining that the at least one SI message comprises the first SI message.

2. The method of claim 1, wherein a time point is a system frame number (SFN).

3. The method of claim 1, further comprising:
   identifying a third value indicating a remaining size of the SI that can be transmitted in the SI window corresponding to the SI window number, after the first SI message is included in the SI window;
   selecting a second SI message, wherein the second SI message has a size smaller than the third value; and
   determining that the second SI message is included in the SI window corresponding to the SI window number.

4. The method of claim 1, further comprising:
   determining at least one SI message being included in another SI window corresponding to another SI window number, after the at least one SI message included in the SI window corresponding to the SI window number is determined.

5. The method of claim 1, wherein the SI window number is included in minimum SI or system information block 1 (SIB 1).

6. The method of claim 1, wherein the at least one SI message is identified based on the SI window number, periodicity of the at least one SI message, and length of the at least one SI message.

7. An apparatus for managing a system information (SI) window in a wireless communication system, the apparatus comprising:
   a transceiver; and
   a controller coupled with the transceiver and configured to control to:
      determine a plurality of SI messages to be transmitted,
      identify a SI window number, and
      determine at least one SI message among the plurality of SI messages, the at least one SI message being included in a SI window corresponding to the SI window number,
   wherein the controller is further configured to:
      identify a first value indicating a maximum size of SI that can be transmitted in the SI window corresponding to the SI window number,
      identify a second value indicating a size of a SI message among the plurality of SI messages,
      in case that the first value is greater than the second value of a first SI message, select the first SI message, wherein the first SI message has a largest size among SI messages having a size smaller than the first value, and
      determine that the at least one SI message comprises the first SI message.

8. The apparatus of claim 7, wherein a time point is a system frame number (SFN).

9. The apparatus of claim 7, wherein the controller is further configured to:
   identify a third value indicating a remaining size of a SI message that can be transmitted in the SI window corresponding to the SI window number, after the first SI message is included in the SI window;
   select a second SI message, wherein the second SI message has a size smaller than the third values; and
   determine that the second SI message is included in the SI window corresponding to the SI window number.

10. The apparatus of claim 7, wherein the SI window number is included in minimum SI or system information block 1 (SIB 1).

11. The apparatus of claim 7, wherein the at least one SI message is identified based on the SI window number, periodicity of the at least one SI message, and length of the at least one SI message.

* * * * *